(12) United States Patent
Powell et al.

(10) Patent No.: US 10,409,470 B2
(45) Date of Patent: Sep. 10, 2019

(54) TOUCH-DISPLAY ACCESSORY WITH RELAYED DISPLAY PLANE

(71) Applicant: Microsoft Technology Licensing, LLC, Redmond, WA (US)

(72) Inventors: Karlton David Powell, Lake Stevens, WA (US); Pablo Luis Sala, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 45 days.

(21) Appl. No.: 15/265,622

(22) Filed: Sep. 14, 2016

(65) Prior Publication Data

US 2018/0074639 A1    Mar. 15, 2018

(51) Int. Cl.
| | |
|---|---|
| *G06F 3/045* | (2006.01) |
| *G06F 3/0484* | (2013.01) |
| *G06F 3/044* | (2006.01) |
| *G06F 3/0362* | (2013.01) |
| *G06F 3/0338* | (2013.01) |
| *G06F 3/038* | (2013.01) |
| *G06F 3/039* | (2013.01) |

(52) U.S. Cl.
CPC .......... *G06F 3/04847* (2013.01); *G06F 3/039* (2013.01); *G06F 3/0338* (2013.01); *G06F 3/0362* (2013.01); *G06F 3/0383* (2013.01); *G06F 3/044* (2013.01); *G06F 2203/04805* (2013.01)

(58) Field of Classification Search
CPC ...... G06F 3/041; G06F 3/0488; G06F 3/0304; G06F 3/0362; G06F 3/039; B60K 2350/102; B60K 2350/1028; B60K 2350/104; B60K 2350/203; B60K 2350/2039; B60K 35/00; B60K 37/06
See application file for complete search history.

(56) References Cited

U.S. PATENT DOCUMENTS

| | | |
|---|---|---|
| 8,269,731 B2 | 9/2012 | Molne |
| 8,764,206 B2 | 7/2014 | Vilardell et al. |

(Continued)

FOREIGN PATENT DOCUMENTS

| | | |
|---|---|---|
| CN | 103176705 A | 6/2013 |
| CN | 104200151 A | 12/2014 |

OTHER PUBLICATIONS

Liou, Jian-Chiun., "Novel Floating and Auto-stereoscopic Display with IRLED Sensors Interactive Virtual Touch System", In Publication of Intech—Optoelectronics—Materials and Devices, Oct. 7, 2015, pp. 417-438.

(Continued)

*Primary Examiner* — Insa Sadio
(74) *Attorney, Agent, or Firm* — Alleman Hall Creasman & Tuttle LLP

(57) ABSTRACT

An accessory for a touch-sensitive display includes an image transfer structure and a capacitive marker. The image transfer structure is configured to relay or transfer, above the touch-sensitive display, an optical display plane of an image displayed by the touch-sensitive display. Further, the capacitive marker is capacitively-recognizable by the touch-sensitive display such that the touch-sensitive display visually presents the image in alignment with the image transfer structure.

20 Claims, 11 Drawing Sheets

(56) References Cited

U.S. PATENT DOCUMENTS

| | | |
|---|---|---|
| 8,985,774 B2 | 3/2015 | Maekawa |
| 2002/0020807 A1* | 2/2002 | Nougaret .............. G06F 3/0488 250/227.11 |
| 2004/0233216 A1* | 11/2004 | Rekimoto ............... G06F 3/046 345/592 |
| 2006/0181517 A1 | 8/2006 | Zadesky et al. |
| 2010/0171681 A1 | 7/2010 | Cabanas et al. |
| 2011/0175797 A1 | 7/2011 | Tomisawa et al. |
| 2011/0291964 A1 | 12/2011 | Chambers et al. |
| 2015/0163338 A1 | 6/2015 | Salo |
| 2015/0169080 A1* | 6/2015 | Choi ..................... G06F 3/0488 345/174 |
| 2016/0018900 A1* | 1/2016 | Tu ......................... G06F 1/3234 345/156 |

OTHER PUBLICATIONS

Zyga, Lisa, "3-D Air-Touch display operates on mobile devices", Published on: Jan. 30, 2014 Available at: http://techxplore.com/news/2014-01-d-air-touch-mobile-devices.html.

Min, et al., "Three-dimensional electro-floating display system using an integral imaging method", In Journal of Optics Express vol. 13, Issue 12, Jun. 13, 2005, pp. 4358-4369.

Miyazaki, Daisuke, "Floating 3D images by 2D image scanning", In Proceedings of SPIE, Dec. 4, 2014, 3 pages.

* cited by examiner

TOUCH-DISPLAY ACCESSORY WITH RELAYED DISPLAY PLANE

BACKGROUND

Accessories may be used to enhance interaction with a touch-sensitive display. For example, an accessory may enable alternative or additional forms of user input to be provided to a touch-sensitive display besides touch input by a finger. Correspondingly, in some cases, the touch-sensitive display may provide alternative or additional functionality based on recognizing user input from the accessory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

An accessory for a touch-sensitive display includes an image transfer structure and a capacitive marker. The image transfer structure is configured to relay or transfer, above the touch-sensitive display, an optical display plane of an image displayed by the touch-sensitive display. Further, the capacitive marker is capacitively-recognizable by the touch-sensitive display such that the touch-sensitive display visually presents the image in alignment with the image transfer structure.

DETAILED DESCRIPTION

A dial-type accessory that is placed on a surface of a touch-sensitive display enhances user interaction with the touch-sensitive display. In particular, the dial-type accessory may be placed on a surface of a touch-sensitive display to provide user input that can be interpreted by the touch-sensitive display as control commands to cause visual presentation of content, adjust various settings and/or perform other operations. However, when an opaque dial-type accessory is placed on the surface of the touch-sensitive display, any image that is visually presented underneath the dial-type accessory is occluded from a user's view.

Accordingly, the present disclosure is directed to an at least partially transparent accessory for a touch-sensitive display. The accessory comprises an image transfer structure configured to relay or transfer, above the touch-sensitive display, an optical display plane of an image displayed by the touch-sensitive display. In some implementations, the display plane may be relayed or transferred such that the image appears to float above the accessory. In other implementations, the display plane may be relayed or transferred such that the image is transferred to a top view surface of the accessory. Further, the accessory includes a capacitive marker that is capacitively-recognizable by the touch-sensitive display such that the touch-sensitive display visually presents the image in alignment with the image transfer structure. By including the image transfer structure in the accessory, display real-estate underneath the accessory may be utilized for additional visual feedback to the user. Moreover, because the accessory is recognizable by the touch-sensitive display, different types of visual feedback that are specifically customized for the accessory may be provided by the touch-sensitive display.

Figure 1A:
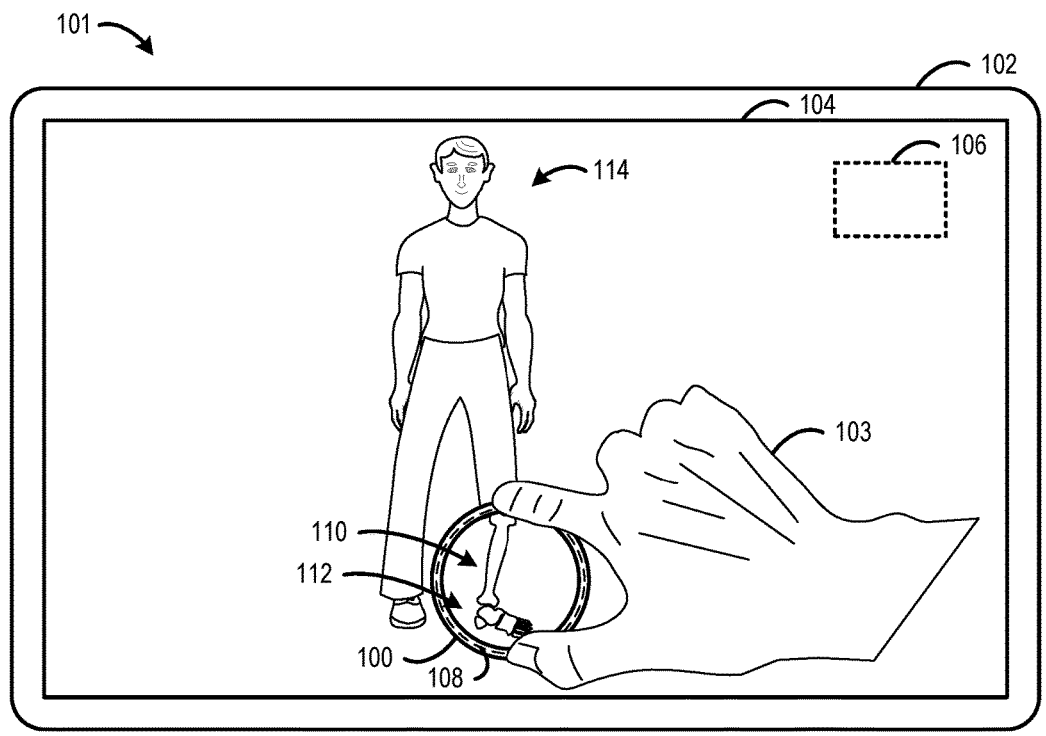
FIGS. 1A and 1B show an accessory interacting with a touch-sensitive display.
Figure 1B:
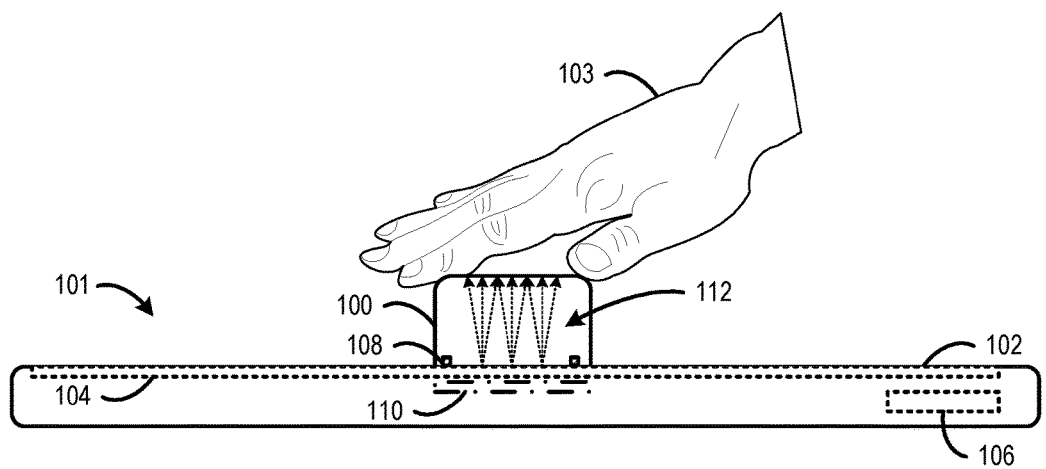

FIGS. 1A and 1B show an accessory 100 interacting with a touch-sensitive display 101. The accessory 100 is cylindrical in shape such that the accessory is grippable by a user's hand 103 to manipulate a position and/or orientation of the accessory 100 on a display surface 102 of the touch-sensitive display 101. For example, the accessory 100 may be rotated in place on the display surface 102 to provide functionality that mimics a dial. The accessory 100 may be translated to different positions on the display surface 102 via the user's hand 103 to cause different interactions between the accessory 100 and the touch-sensitive display 101. Accessory 100 is provided as a non-limiting example. Other sizes and/or shapes of accessories are envisaged.

The touch-sensitive display 101 includes a touch sensor 104 configured to detect touch input from one or more touch sources, such as hand 103 and/or the accessory 100. The touch sensor 104 may be configured to detect active and/or passive touch input, and the accessory 100 may be cooperatively configured to provide active and/or passive touch input. In some implementations, the accessory 100 may be configured to provide passive touch input in which the accessory 100 does not produce an electrical signal corresponding to touch input. In other implementations, when active touch input is enabled, the accessory 100 may be configured to generate an electrical signal that is detected by the touch sensor 104. The touch sensor 104 may be configured to receive input from input sources in direct contact with a surface of the touch-sensitive display 101, and/or, input from input sources not in direct contact with the touch-sensitive display 101 (e.g., input devices that hover proximate to a surface of the display). "Touch input" as used herein refers to both types of input. In some implementations, the touch-sensitive display 101 may be configured to recognize different touch-input gestures provided by different types of touch input sources.

The touch sensor 104 may take any suitable form including, but not limited to, a capacitive touch sensing matrix, a resistive touch sensing matrix, and an optical touch sensing system. Alternatively or additionally, the touch-sensitive display 101 may include a digitizer configured to determine a position of the accessory 100 and/or other devices in electronic communication with the touch-sensitive display 101.

The touch-sensitive display 101 may be configured to recognize touch input from the accessory 100 and differentiate between touch input from the accessory 100 and other sources (e.g., a finger). In particular, the touch-sensitive display 101 includes an accessory detection tool 106 configured to receive touch information corresponding to touch input from the touch sensor 104. In one example, the touch information includes a two-dimensional (2D) map, or touch data frame, that details a plurality of pixels. In some implementations, each pixel may be represented by a capacitance, resistance, light intensity, or other value that is indicative of touch.

Furthermore, the accessory detection tool 106 is configured to determine, from the touch information, a position of the accessory 100. In particular, the accessory 100 includes a marker 108 that forms a pattern that is recognizable by the accessory detection tool 106. In some implementations, the marker 108 is positioned on an under-surface of the accessory 100 that interfaces with the touch-sensitive display. In other implementations, the marker 108 is offset from such an interface surface of the accessory 100. The marker 108 may include any suitable type of material forming any suitable pattern recognizable by the touch sensor 104. In implementations where the touch sensor 104 is a capacitive touch sensor, the marker 108 is a capacitive marker including material that influences a capacitance detected by the touch sensor 104. For example, the marker 108 may include metal foil, transparent indium tin oxide (ITO), or another conductive material. Further, a thin protective layer or material may be placed beneath marker 108, between marker 108 and touch sensor 104, in order to protect both accessory 112 and touch sensor 101 from scratching or damage from relative movement, thin enough to have limited impact on sensing signal strength.

Figure 2:
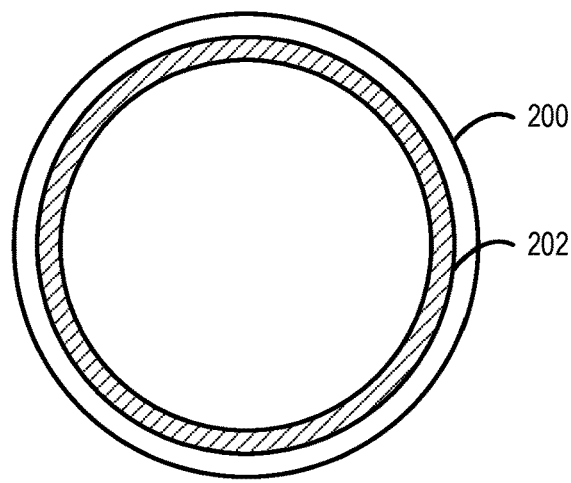
FIG. 2 shows a bottom view of an accessory including a capacitive marker that is capacitively-recognizable by a touch-sensitive display.
Figure 3:
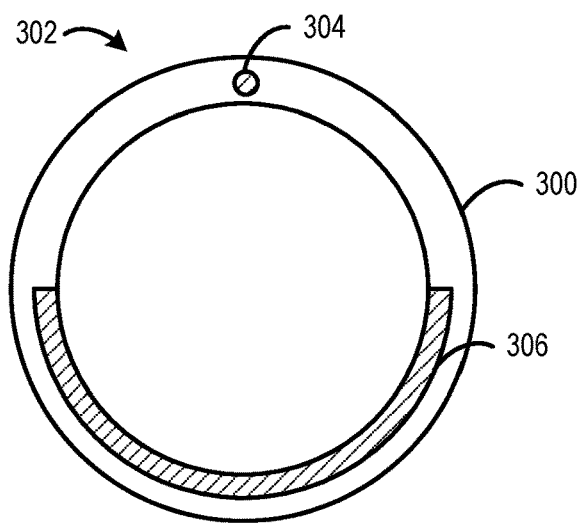
FIG. 3 shows a bottom view of another accessory including a capacitive marker that is capacitively-recognizable by a touch-sensitive display.

FIGS. 2 and 3 show different implementations of accessories including different patterns of capacitive markers. FIG. 2 shows a bottom view of an accessory 200 including a capacitive marker 202 in the form of an annular ring that is orientation agnostic. This particular pattern is symmetrical and thus does not indicate a rotational orientation of the accessory 200 to a touch sensor.

FIG. 3 shows a bottom view of an accessory 300 including a capacitive marker 302 that indicates a rotational orientation of the accessory 300. In particular, the capacitive marker 302 includes a dot feature 304 and a half ring feature 306 that collectively indicate the rotational orientation of the accessory 300. For example, the position of the dot feature 304 relative to the position of the half ring feature 306 may indicate a direction that the accessory is pointing. An accessory may include a marker that includes any suitable features from which a rotational orientation of the accessory is recognizable by the touch-sensitive display.

Returning to FIG. 1, in some implementations, the accessory detection tool 106 may be previously trained via machine learning to determine a position of the accessory 100 based on the touch information. Any suitable machine-learning approach may be used to train the accessory detection tool 106. In one example, a randomized decision forest approach is used to train the accessory detection tool 106. Using this approach, a testing accessory mimicking accessory 100 may be positioned at a plurality of different possible locations during a training phase, and the accessory detection tool 106 may be supplied with ground truths specifying the precise position of the testing accessory. In one example, the testing accessory may be used with automated alignment staging to provide feedback of the position (e.g., X, Y coordinate) and rotational orientation of the testing accessory. In another example, the test accessory may be placed in a caddy that provides position and rotational orientation feedback from the touch sensor 104. This "position" may be specified as the center pixel (e.g., the pixel at a centermost position of the testing accessory). In this way, the accessory detection tool can effectively learn what different accessory positions will look like to touch sensor 104 by associating supplied ground truths with the sensed touch information. After training, the accessory detection tool 106 may assign a probability that each pixel is the center pixel based on a given frame of touch information, and the pixel with the highest probability can be interpreted as the "position" of the accessory 100.

In some implementations, the accessory detection tool 106 may be configured to detect and differentiate between multiple different accessories that are placed on the display surface 102. For example, different accessories may have different patterns and/or capacitive signatures that are recognized by the accessory detection tool 106. The preceding is not intended to be limiting. Accessory position may be determined in any suitable manner.

Upon determining the position of the accessory 100, the touch-sensitive display 101 is configured to visually present an image 110 in alignment with the determined position of the accessory 100. In this way, images displayed directly under the accessory may be viewed through the at least partially transparent accessory. The touch-sensitive display 101 may be configured to visually present any suitable image in alignment with the determined position of the accessory 100.

Image transfer structure 112 is at least partially transparent and allows display real-estate underneath the accessory 100 to be utilized. To take advantage of the at least partial transparency of the image transfer structure 112, the touch-sensitive display 101 may visually present the image 110 in alignment with the image transfer structure 112. For example, the touch-sensitive display 101 may visually present the image 110 using a predetermined number of pixels around the center pixel of the accessory 100, where the predetermined number of pixels is preprogrammed based on the known size and shape of the image transfer structure 112.

In some implementations, the touch-sensitive display 101 may visually present other images positioned in relation to the determined position of the accessory 100 and/or the image transfer structure 112. For example, such images may be visually presented beyond a perimeter of the accessory (e.g., directly adjacent the accessory 100).

In some implementations where the touch-sensitive display 101 is configured to detect multiple different accessories, the touch-sensitive display 101 may be configured to visually present images in alignment with the multiple different accessories. Further, the touch-sensitive display 101 may be configured to visually present other images positioned in relation to the determined positions of the multiple accessories. For example, when the accessories are spaced further apart from each other on the touch-sensitive display, then images surrounding the perimeters of the accessories may be larger. On the other hand, when the accessories are spaced closer together on the touch-sensitive display, then images surrounding the perimeters of the accessories may be smaller. The surrounding images may be visually presented based on the relative positions of the accessories in any suitable manner.

In the example illustrated in FIG. 1, the interaction between the accessory 100 and the touch-sensitive display 101 provides simulated X-ray vision functionality. In particular, the touch-sensitive display 101 visually presents an image of a person 114. The image of the person 114 may be visually presented even when the accessory 100 is not placed on the display surface 102. When the accessory 100 is placed on the display surface 102, the touch-sensitive display 101 detects the position of the accessory 100 by using the accessory detection tool 106 to identify the marker 108. Also, the touch-sensitive display 101 determines the portion of the display that is covered by the image transfer structure 112 based on the determined position of the accessory 100. The touch-sensitive display 101 visually presents the image 110 in the portion of the display that is covered by the image transfer structure 112 such that the image 110 is aligned with image transfer structure 112. The image transfer structure 112 relays or transfers the optical display plane of the image 110 above the display surface 102. In particular, the image 110 includes foot and leg bones of the person 114. In other words, the accessory 100 interacts with the touch-sensitive display 101 to provide the ability to see through the physical elements (e.g., pants, shoes, skin, and muscles) of the person 114 to reveal the person's bones. As the accessory 100 is moved to cover different portions of the person 114, the touch-sensitive display 101 visually presents the person's bones corresponding to the different portions in alignment with the image transfer structure 112.

The illustrated scenario is provided as an example, and the touch-sensitive display 101 may visually present any suitable image to facilitate any suitable interaction with the accessory 100.

Figure 4:
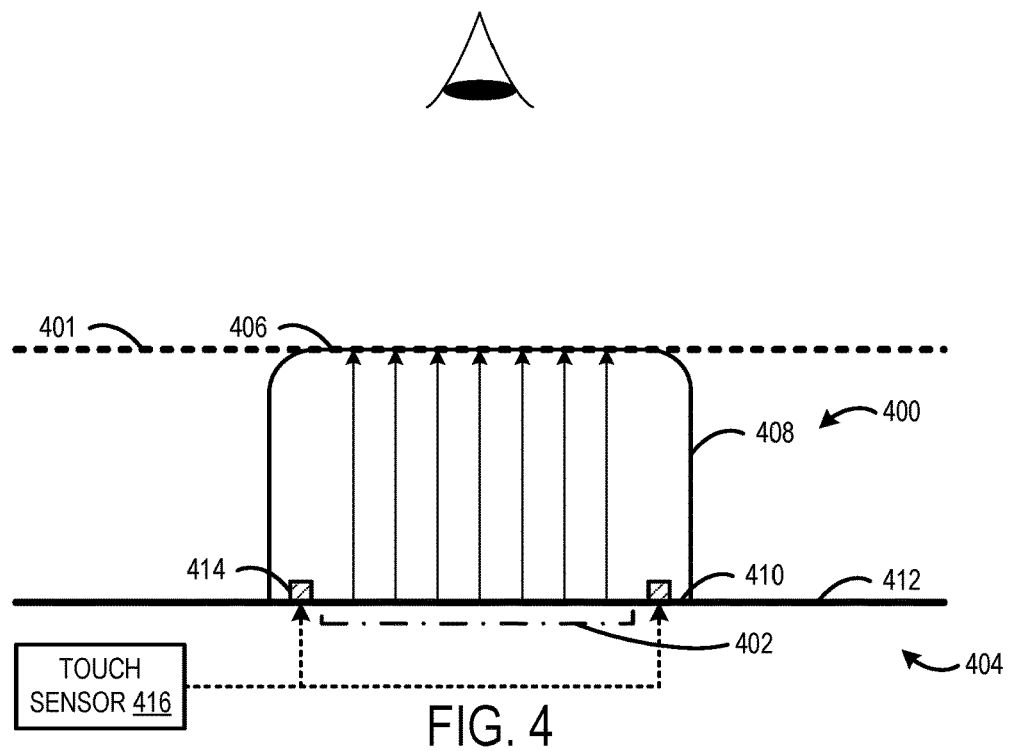
FIG. 4 shows an accessory configured to relay or transfer a display plane of an image visually presented by a touch-sensitive display to a view surface of the accessory.
Figure 5:
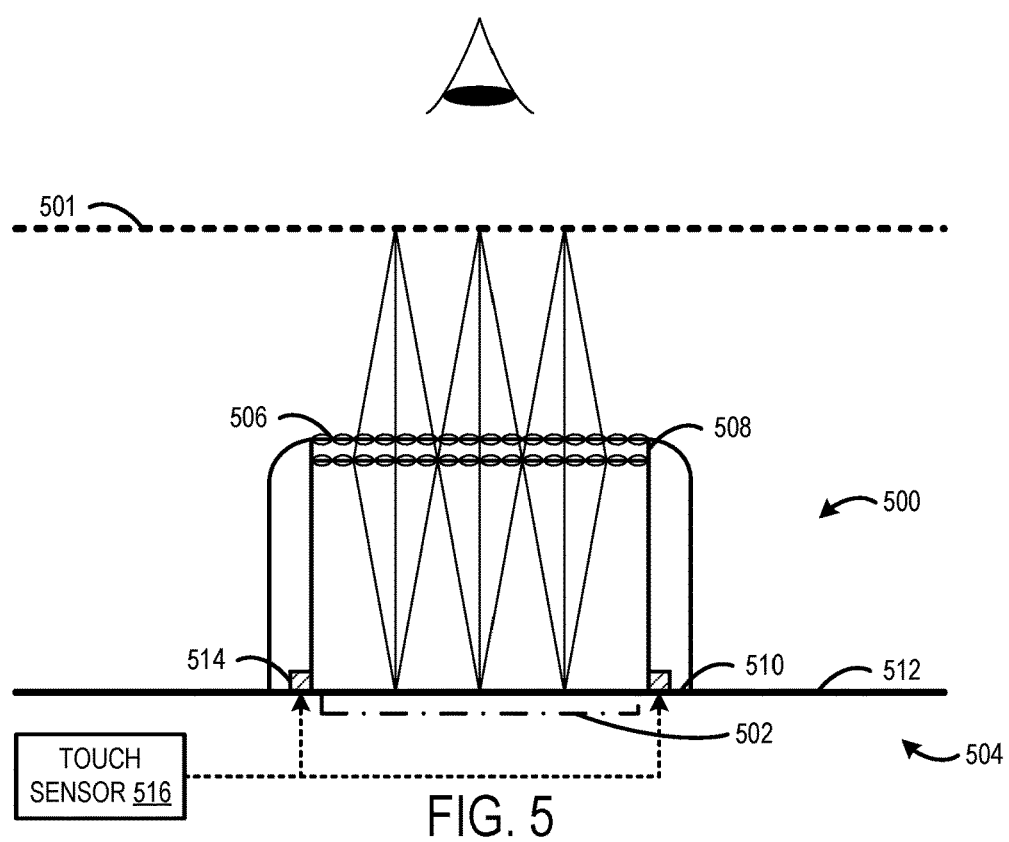
FIG. 5 shows an accessory configured to relay or transfer a display plane of an image visually presented by a touch-sensitive display above a projection surface of the accessory.

As discussed above, an accessory may be configured to relay or transfer, above a touch-sensitive display, an optical display plane of an image that is visually presented by the touch-sensitive display. FIGS. 4 and 5 show different implementations of accessories that relay or transfer the optical display plane to different levels. FIG. 4 shows an accessory 400 configured to relay or transfer an image 402 visually presented by a touch-sensitive display 404 to a view surface 406 of the accessory 400. The accessory 400 includes an image transfer structure 408. The image transfer structure 408 includes the view surface 406 and an interface surface 410 spaced apart from the view surface 406. The interface surface 410 is configured to be placed on a display surface 412 of the touch-sensitive display 404. A capacitive marker 414 is fixed relative to the image transfer structure 408 and flush with the interface surface 410. A capacitive touch sensor 416 is configured to capacitively-recognize the capacitive marker 414 to determine a position of the accessory 400 such that the touch-sensitive display 404 visually presents the image 402 in alignment with the image transfer structure 408. The image transfer structure 408 is configured to relay or transfer the image 402 from the display surface 412 of the touch-sensitive display 404 to the view surface 406 of the accessory 400 such that the image 402 has an optical display plane 401 in alignment with the view surface 412. Note that the capacitive marker 414 may be a conductive layer that is either opaque, such as a conductive metal layer, or transparent, such as a conductive oxide such as ITO (indium tin oxide). In some cases, by making use of a transparent conductive layer for the capacitive marker 414, the usable display area beneath the accessory may be increased.

The image transfer structure 408 may include any suitable material(s) that relays or transfers the image 402 to the view surface 406. In one example, the image transfer structure 408 includes a fiber optic faceplate between the view surface 406 and the interface surface 410. The fiber optic faceplate may be made of glass, polymer, or another fiber optic material. The faceplate may also include an image transfer media which makes use of 2D Anderson Localization, which may further provide a suitable substrate for a transparent conductive layer.

FIG. 5 shows an accessory 500 configured to relay or transfer an image 502 visually presented by a touch-sensitive display 504. In this implementation, the image 502 is relayed or transferred such that an optical display plane 501 of the image 502 is above a projection surface 506 of the accessory 500. The accessory 500 includes an image transfer structure 508. The image transfer structure 508 includes the projection surface 506 and an interface surface 510 spaced apart from the projection surface 506. The interface surface 510 is configured to be placed on a display surface 512 of the touch-sensitive display 504. A capacitive marker 514 is fixed relative to the image transfer structure 508 and flush with the interface surface 510. A touch sensor 516 is configured to capacitively-recognize the capacitive marker 514 to determine a position of the accessory 500 such that the touch-sensitive display 504 visually presents the image 502 in alignment with the image transfer structure 508. The image transfer structure 508 is configured to relay or transfer the image 502 from the display surface 512 of the touch-sensitive display 504 to above the projection surface 506 of the accessory 500 in alignment with the optical display plane 501. Because the optical display plane 501 is relayed or transferred above the projection surface 506, the image 502 may appear to be located closer to a user's eye than the projection surface 506 such that the image 502 appears to float in midair like a hologram. The spacing between the optical display plane 501 and the projection surface 506 may be tuned. In some implementations, the spacing between the optical display plane 501 and the projection surface 506 will equal the spacing between the projection surface 506 and the interface surface 510. In one example, the image transfer structure 508 is approximately twenty five millimeters thick and the image 502 appears to hover approximately twenty five millimeters in the air above the surface 506 of the accessory 500.

The image transfer structure 508 may include any suitable material that relays or transfers the optical display plane 501 of the image 502 above the projection surface 506. In one example, the image transfer structure 508 includes an array-based imaging sheet between the projection surface 506 and the interface surface 510. For example, the array-based imaging sheet may be operatively coupled to a substrate such that the array-based imaging sheet is positioned on the projection surface 506 and the substrate extends from the array-based imaging sheet to the interface surface 510.

Figure 6:
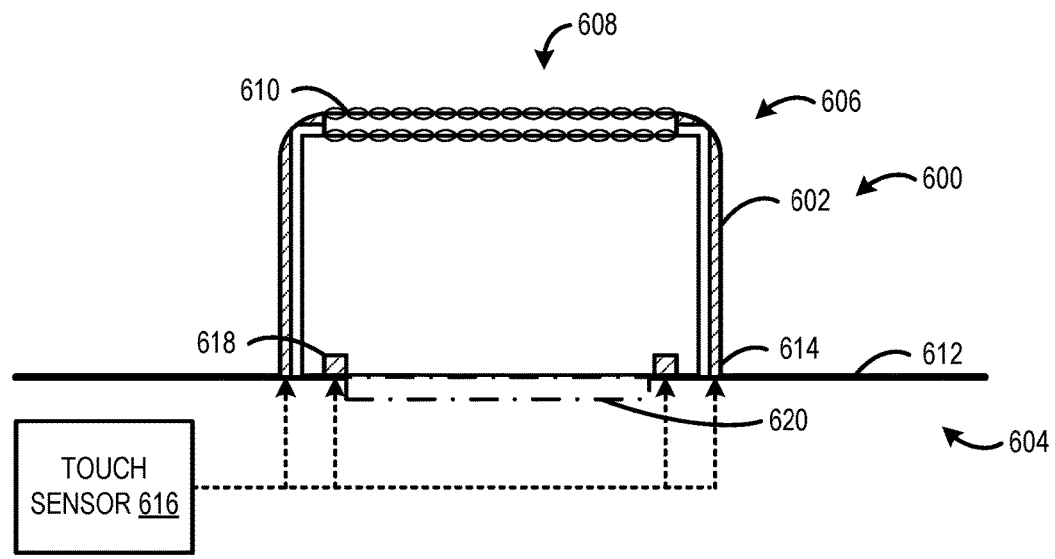
FIG. 6 shows an accessory including a capacitive touch indicator that allows a touch-sensitive display to recognize touch input on the capacitive touch indicator.
Figure 7:
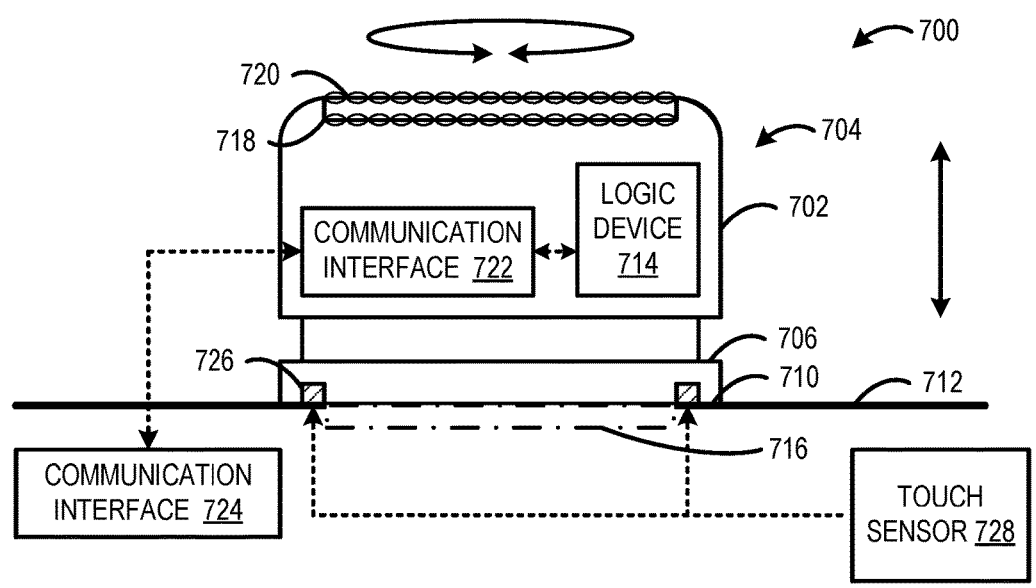
FIG. 7 shows an accessory including a button and a gripping member configured to rotationally interface with a base.

In some implementations, an accessory may be configured to provide user input to a touch-sensitive display in forms other than direct touch input from a capacitive marker that is detected by a touch sensor of the touch-sensitive display. FIGS. 6 and 7 show different implementations of accessories that are configured to provide different types of user input to a touch-sensitive display.

FIG. 6 shows an accessory 600 including a capacitive touch indicator 602 that allows a touch-sensitive display 604 to recognize touch input on the capacitive touch indicator 602. The accessory 600 includes a gripping member 606 forming an aperture 608 at least partially filled by an image transfer structure 610.

The gripping member 606 is configured to be grippable by a user's hand to manipulate (e.g., rotate, translate) the accessory 600 on a display surface 612 of the touch-sensitive display 604. The gripping member 606 may take any suitable form. In the illustrated implementation, the gripping member 606 is cylindrical or puck-shaped. The gripping member 606 may include any suitable material. For example, the gripping member 606 may include metal or plastic. In one example, the gripping member 606 includes an annular ring of opaque plastic that inhibits image light from exiting portions of the accessory 600 other than through the aperture 608.

The capacitive touch indicator 602 is operatively coupled to the gripping member 606 and extends at least proximate to an interface surface 614 of the accessory 600. In some implementations, the capacitive touch indicator 602 is positioned flush with the interface surface 614. In some implementations, the capacitive touch indicator 602 may include a plurality of traces that extend down the sides of the gripping member 606 to the interface surface 614. In some configurations, the gripping member 606 may be made of conductive material and may act as the capacitive touch indicator 602. In some implementations, the capacitive touch indicator 602 may include a plurality of traces that extend down the sides of the image transfer structure 610 and the gripping member 606 may be omitted from the accessory 600.

The capacitive touch indicator 602 is configured such that touch input on the capacitive touch indicator 602 is capacitively-recognizable by a touch sensor 616 of the touch-sensitive display 604. In particular, the capacitive touch indicator 602 may include conductive material that influences a capacitance detected by the touch sensor 616 and varies based on touch input to the capacitive touch indicator 602. For example, the capacitive touch indicator 602 may include metal, transparent indium tin oxide (ITO), or another conductive material.

In some implementations, the capacitive touch indicator 602 may be electrically separated from a capacitive marker 618 of the accessory 600. In some such implementations, the touch sensor 616 may recognize separate capacitive signatures for the capacitive touch indicator 602 and the capacitive marker 618. In other implementations, the capacitive touch indicator 602 may be electrically connected to the capacitive marker 618. In some such implementations, the touch sensor 616 may recognize touch input to the capacitive touch indicator 602 based on variations in capacitance of the capacitive marker 618.

The touch-sensitive display 604 is configured to visually present an image 620 in alignment with the image transfer structure 610 and through the aperture 608 based on capacitively-recognizing the capacitive marker 618. Further, the touch-sensitive display 604 may be configured to change visual presentation of the image 620 based on capacitively-recognizing the touch input on the capacitive touch indicator.

Figure 8A:
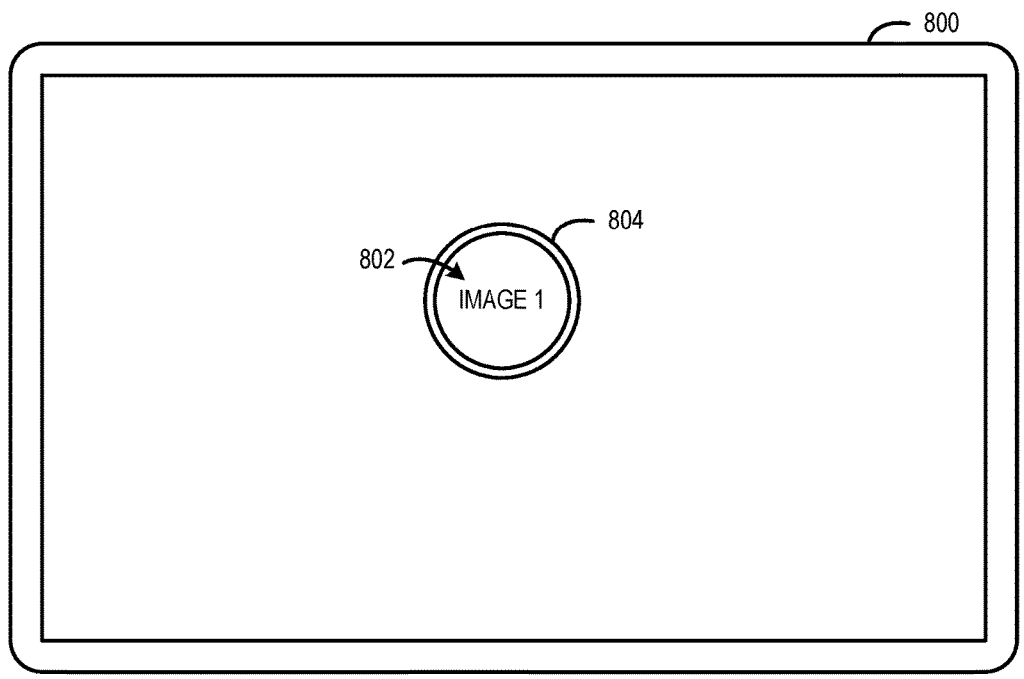
FIGS. 8A and 8B show a scenario in which a touch-sensitive display visually presents different images in alignment with an accessory based on capacitively-recognizing touch input on the accessory.
Figure 8B:
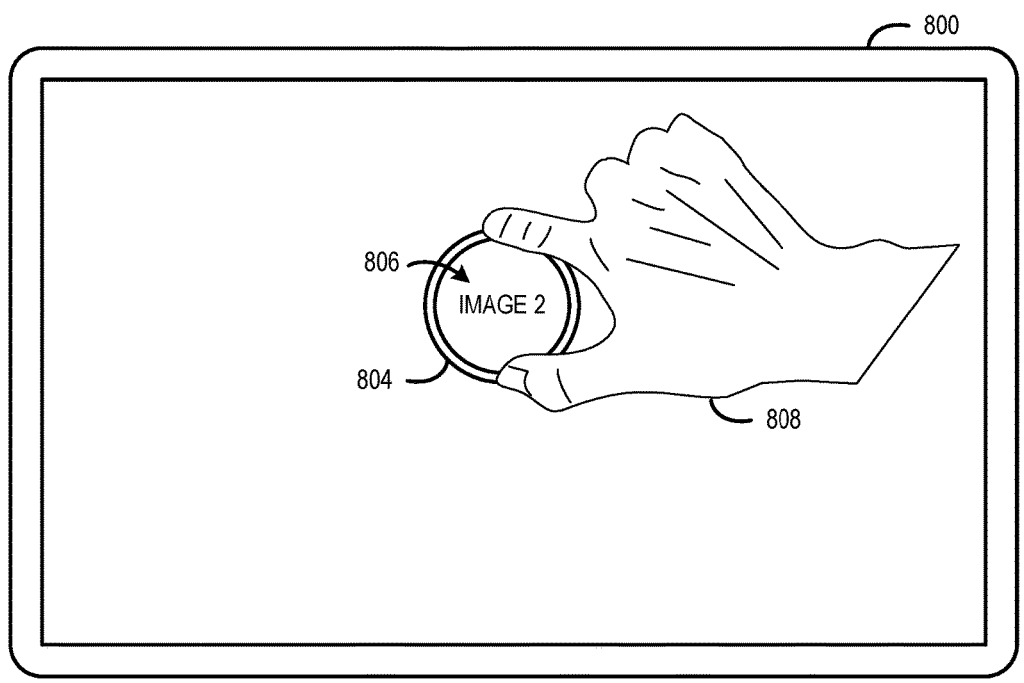

As shown in FIG. 8A, a touch-sensitive display 800 visually presents a first image 802 through an accessory 804 based on the touch-sensitive display 800 determining that no touch input is provided to the accessory 804. In particular, the touch-sensitive display 800 does not detect a capacitive signature of touch input to the accessory 804. Further, in FIG. 8B, the touch-sensitive display 800 visually presents a second image 806 through the accessory 804 in response to determining that touch input is provided to the accessory 804. The second image 806 differs from the first image 802 shown in FIG. 8A. In particular, the touch-sensitive display 800 detects a capacitive signature of touch input to the accessory 804 and varies visual presentation based on detecting such touch input. The touch-sensitive display 800 may vary visual presentation of different images in any suitable manner based on detecting touch input to the accessory 804.

In some implementations, the image transfer structure may be omitted from the accessory, and the capacitive marker may be operatively coupled to the gripping member. In one example, the accessory may include an opaque annular ring surrounding an open aperture or a clear plate, and the capacitive marker may be operatively coupled to the opaque ring. In another example, the accessory may include a clear plate and the capacitive marker may include a transparent conductive layer operatively coupled to the clear plate. In such implementations, the touch-sensitive display may visually present an image in alignment with the accessory based on capacitively-recognizing the capacitive marker such that the image is viewable through the aperture formed in the gripping member without the optical display plane of the image being relayed or transferred from the display surface of the touch-sensitive display.

FIG. 7 shows an accessory 700 including a button 702 and a gripping member 704 configured to rotationally interface with a base 706 to provide user input information to a touch-sensitive display 708. The base 706 includes an interface surface 710 configured to be placed on a display surface 712 of the touch-sensitive display 708. Further, the base 706 is configured to rotationally interface with the gripping member 704 (i.e., the gripping member rotates relative to the base). In some implementations, the gripping member continuously rotates relative to the base 706. In other implementations, the gripping member 704 may have a neutral position relative to the base 706 and may include a spring that biases the gripping member 704 back to the neutral position when the gripping member 704 is released from a user's hand. In one example, the base 706 and/or the gripping member 704 may include a rotary encoder and an annular bearing to convert an angular position or motion to user input information.

In some implementations, an accessory may not include pieces that rotate relative to one another, and the entire accessory may rotate on the display. In such implementations, rotation of the accessory may be capacitively-recognized by a touch-sensitive display based on a fiducial rotary indexing or other rotational-orientation-indicating features incorporated into a capacitive marker of the accessory.

The button 702 is depressible such that the gripping member 704 moves towards the base 706 when the button 702 is pressed. The button 702 may include a spring that biases the gripping member 704 back to a neutral position when the gripping member 704 is not pressed. The button 702 may take any suitable form.

The accessory 700 includes a logic device 714 configured to derive user input information from a relative rotational position of the gripping member 704 and the base 706. For example, the gripping member 704 may be rotated by a particular rotational angle to effect a corresponding user input command. Further, the logic device 714 is configured to derive user input information from a state (e.g., pressed, not pressed) of the button 702. The logic device 714 may be housed in the gripping member 704 and/or the base 706 such that the logic device 714 does not interfere with display transmission. Note that the logic device 714 is schematically depicted.

The accessory 700 may transmit the user input information to the touch-sensitive display 708 via a communication interface 722. The communication interface 722 is configured to communicatively couple the accessory 700 with a communication interface 724 of the touch-sensitive display 708. The communication interface 722 may be housed in the gripping member 704 and/or the base 706 such that the communication interface 722 does not interfere with display transmission. Note that the communication interface 722 is schematically depicted. The communication interface 722 may include any suitable wireless communication componentry. In one example, the communication interface 722 includes a personal area network transceiver (e.g., a Bluetooth transceiver). The communication interface 722 may employ any suitable type and/or number of different communication protocols to communicatively couple the accessory 700 with a touch-sensitive display device or other computing device.

The touch-sensitive display 708 is configured to visually present the image 716 in alignment with the image transfer structure 718 based on capacitively-recognizing a capacitive marker 726 via a touch sensor 728. Further, the touch-sensitive display 708 may be configured to change visual presentation of the image 716 based on receiving, from the accessory 700, user input information that corresponds to the gripping member 704 being rotated and/or the button 702 being pressed.

Figure 9A:
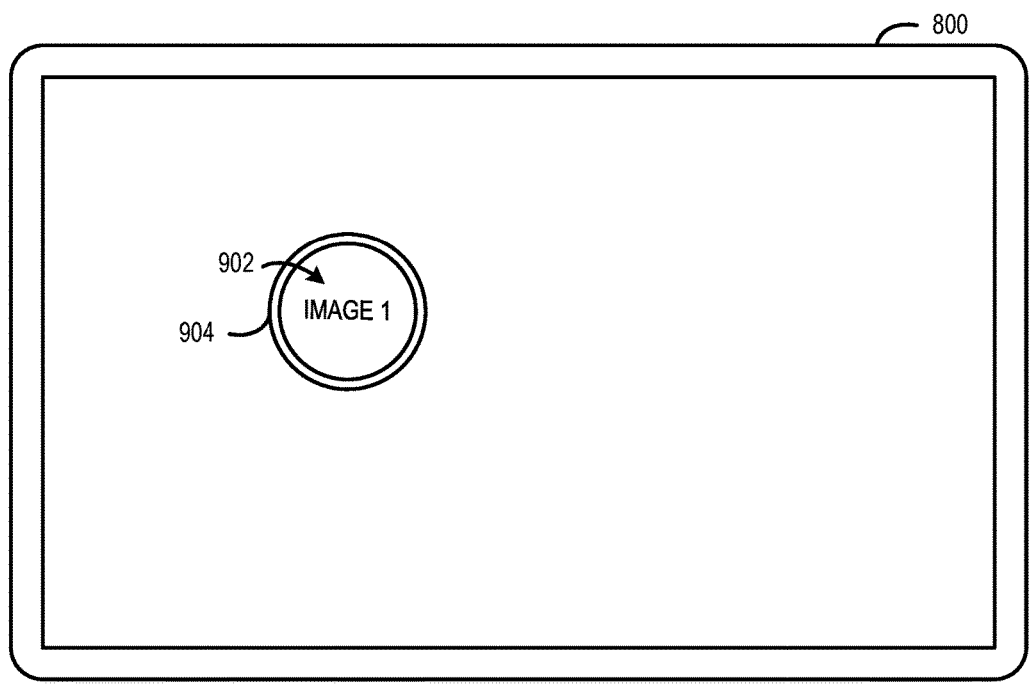
FIGS. 9A and 9B show a scenario in which a touch-sensitive display visually presents different images in alignment with an accessory based on user input information derived from rotation of the accessory.
Figure 9B:
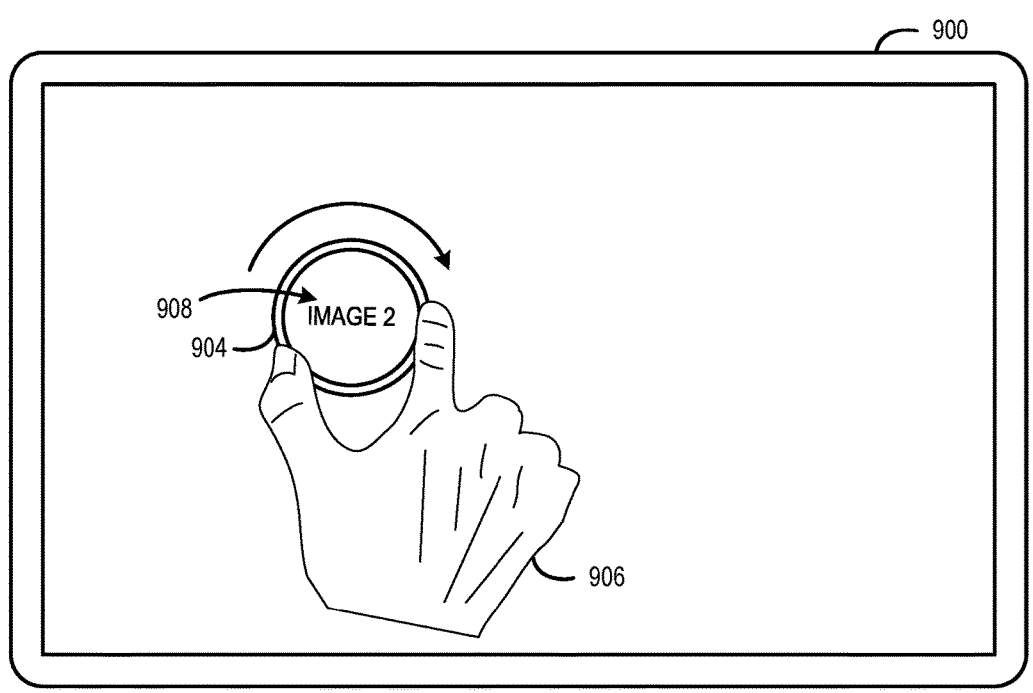

As shown in FIG. 9A, a touch-sensitive display 900 visually presents a first image 902 in alignment with an accessory 904 based on the touch-sensitive display 900 determining that the accessory 904 is in a first rotational position (e.g., a neutral position). Further, in FIG. 9B, a user's hand 906 rotates the accessory 904 clockwise from the first rotational position to a second rotational position. The touch-sensitive display 900 visually presents a second image 908 in alignment with the accessory 904 in response to determining that the accessory 904 is rotated to the second rotational position. For example, the rotation positions of the accessory 904 may be received by the touch-sensitive display 900 via a communication interface of the accessory 904. The second image 908 differs from the first image 902 shown in FIG. 9A. The touch-sensitive display 900 may vary visual presentation of different images in any suitable manner based on detecting rotation of the accessory 904.

Figure 10A:
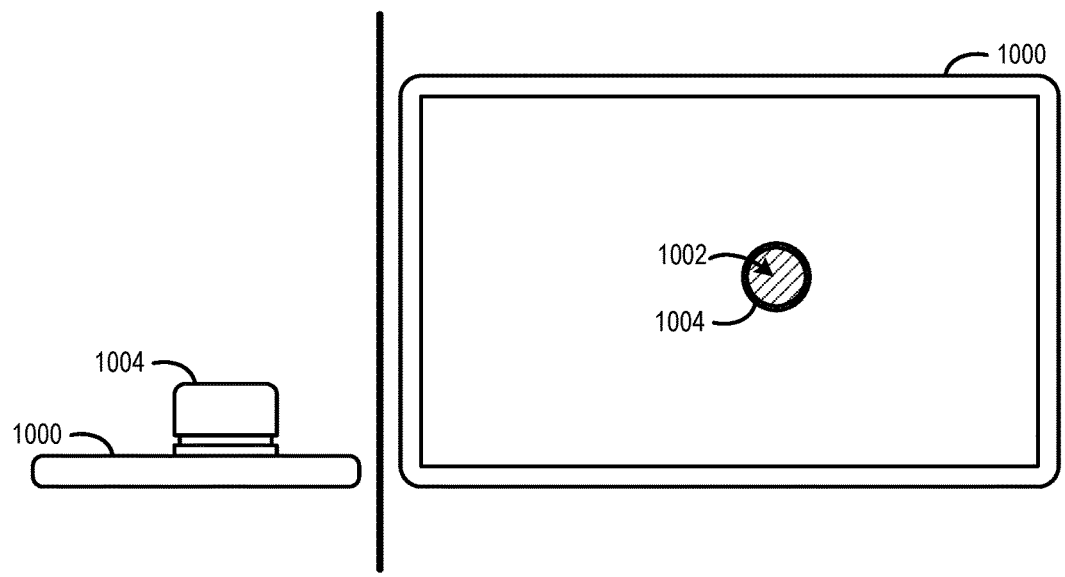
FIGS. 10A and 10B show a scenario in which a touch-sensitive display visually presents different images in alignment with an accessory based on user input information derived from a button being pressed on the accessory.
Figure 10B:
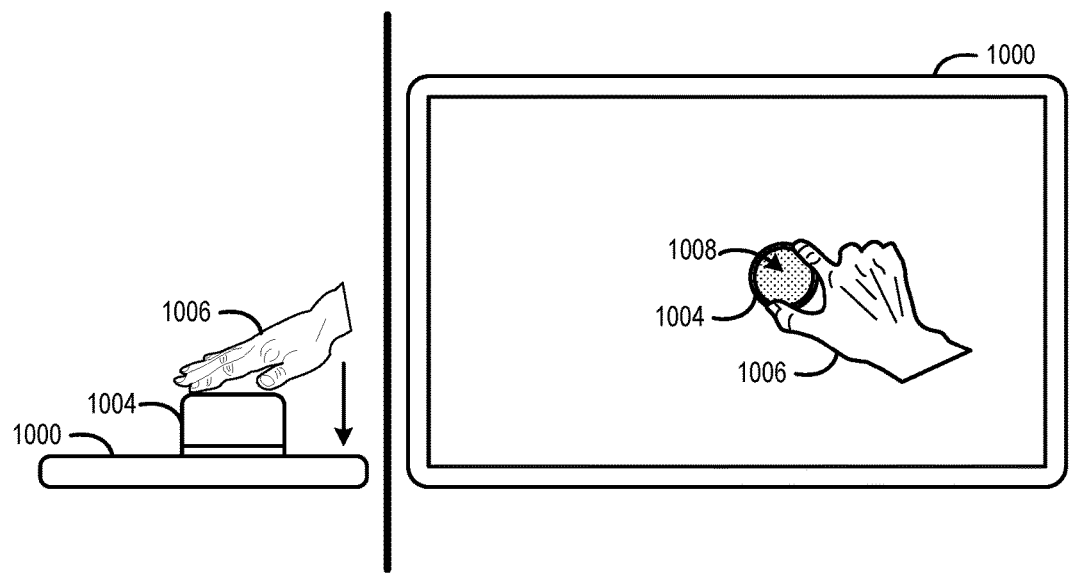

As shown in FIG. 10A, a touch-sensitive display 1000 visually presents a first image 1002 in alignment with an accessory 1004 based on the touch-sensitive display 1000 determining that a button of the accessory 1004 is in a first state (e.g., a non-pressed, neutral position). Further, in FIG. 10B, a user's hand 1006 presses the button on the accessory 1004. The touch-sensitive display 1000 visually presents a second image 1008 in alignment with the accessory 1004 in response to determining that the button of the accessory 1004 is in a second state (e.g., a pressed position). For example, the states of the button of the accessory 1004 may be received by the touch-sensitive display 1000 via a communication interface of the accessory 904. The second image 1008 differs from the first image 1002 shown in FIG. 10A. The touch-sensitive display 1000 may vary visual presentation of different images in any suitable manner based on detecting a state of the button of the accessory 1004.

Figure 11A:
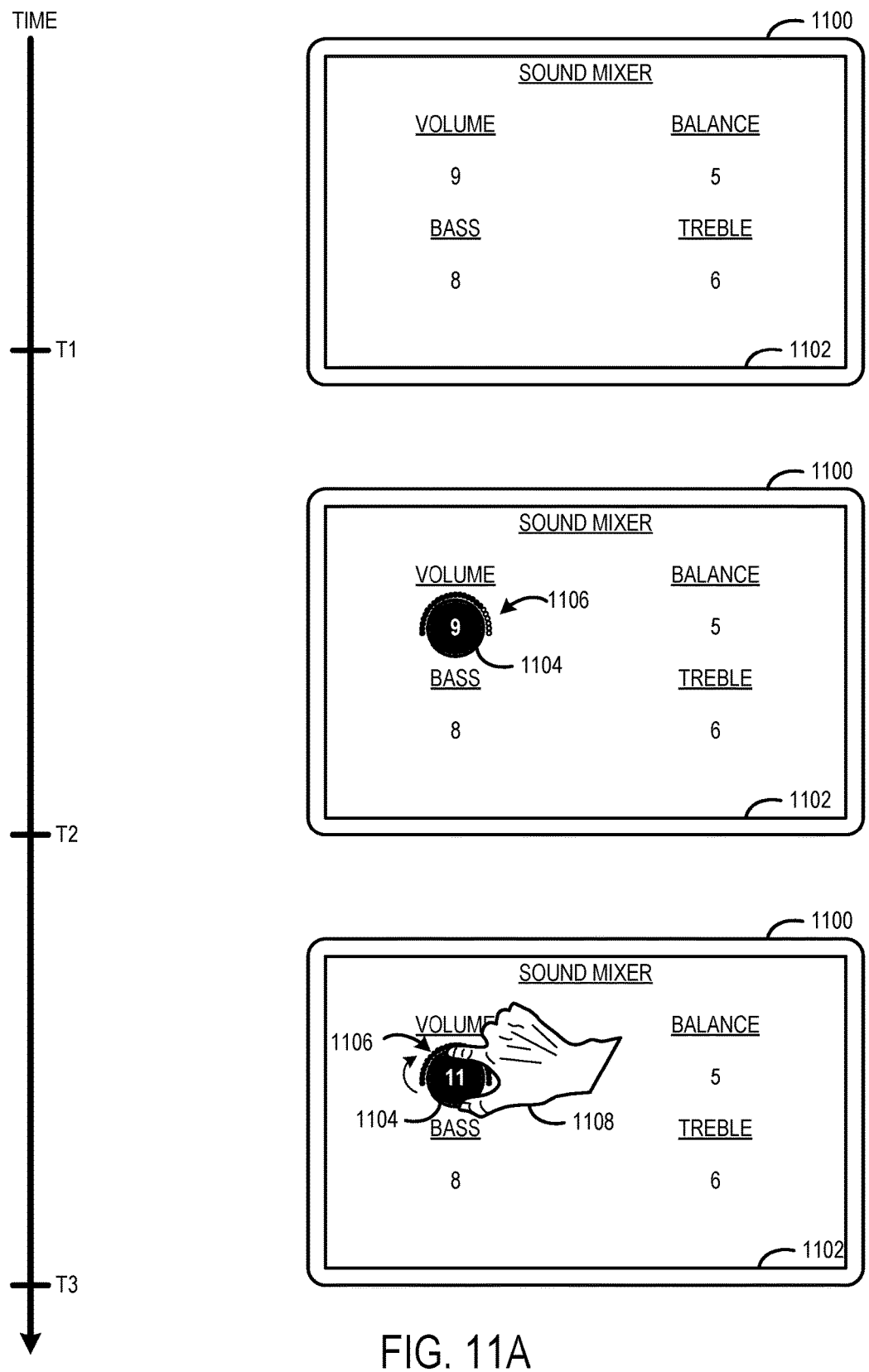
FIGS. 11A and 11B show a scenario in which a touch-sensitive display visually presents different images in alignment with an accessory as the accessory is moved to different regions of the touch-sensitive display.
Figure 11B:
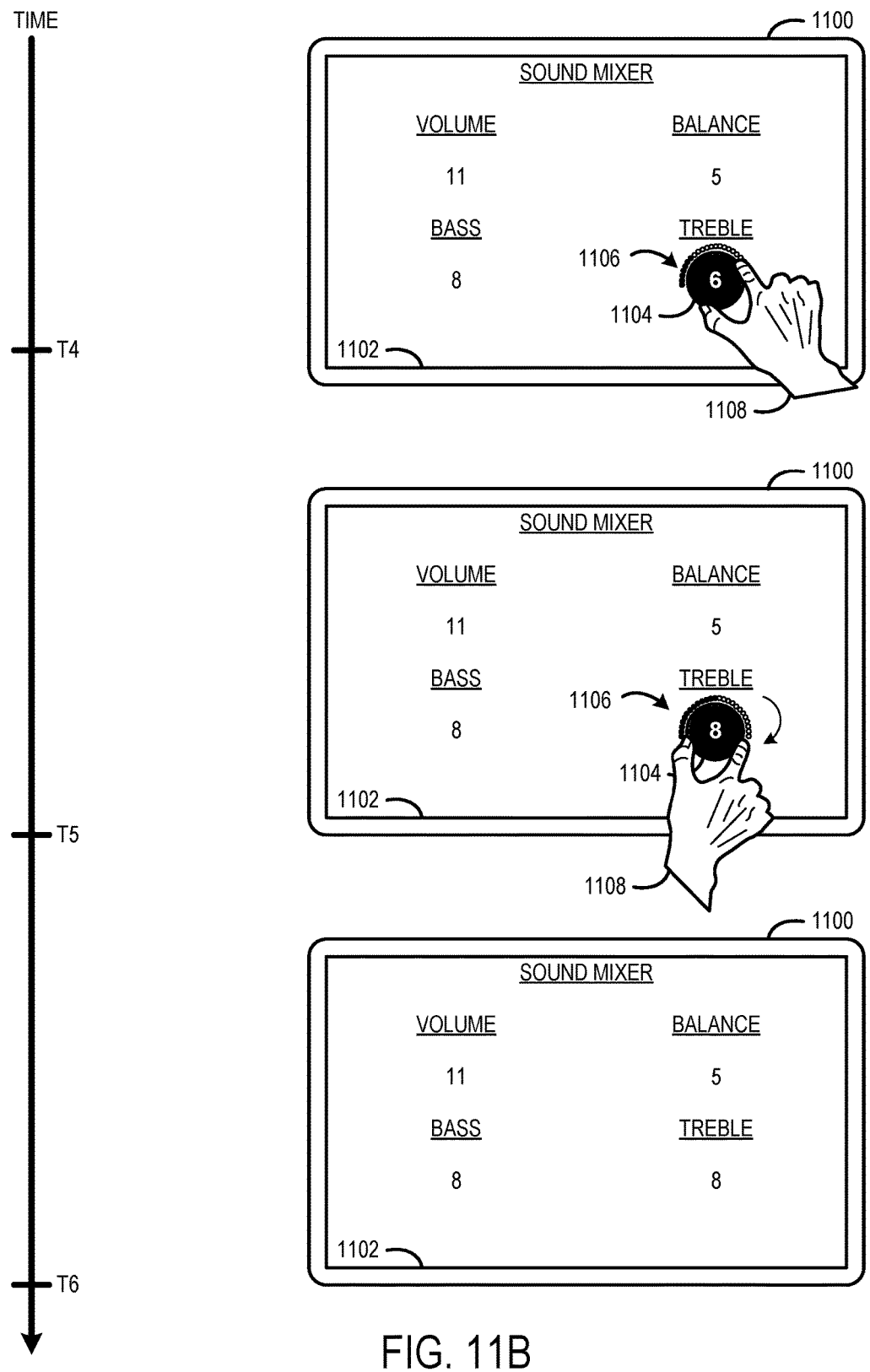

FIGS. 11A and 11B show a scenario in which a touch-sensitive display visually presents different images based on interaction with an accessory 1104. In particular, the touch-sensitive display 1100 visually presents a graphical user interface visually representing a sound mixer application that controls settings for an audio system. The sound mixer application includes settings to control volume, balance, bass, and treble. At time T1, an accessory is not placed on a display surface 1102 of the touch-sensitive display 1100. Further, the volume is set to a level of 9, the balance is set to a level of 5, the bass is set to a level of 8, and the treble is set to a level of 6.

At time T2, an accessory 1104 is placed on the display surface 1102. The touch-sensitive display 1100 capacitively-recognizes a position of the accessory 1104 and determines that the position of the accessory 1104 is aligned with the volume level. Accordingly, the touch-sensitive display 1100 changes the appearance of the numerical indicator displayed through the accessory 1104 and presents an image 1106 in the form of a volume meter wrapping around the accessory 1104. In particular, the volume meter graphically depicts the volume level as a plurality of black dots surrounding a perimeter of the accessory 1104.

At time T3, a user's hand 1108 grips the accessory 1104 and rotates the accessory 1104 clockwise to increase the volume level. The touch-sensitive display 1100 changes the numerical indicator displayed through the accessory 1104, providing feedback that the volume level goes to 11. Further, the number of black dots in the volume meter is increased based on the rotation of the accessory 1104 to provide visual feedback of the increased volume.

As shown in FIG. 11B, at time T4, the user's hand 1108 moves the accessory 1104 across the display surface 1102 to the treble level. The touch-sensitive display 1100 determines that the position of the accessory 1104 is aligned with the treble level. Accordingly, the touch-sensitive display 1100 changes the appearance of the numerical indicator displayed through the accessory 1104 and presents an image 1106 in the form of a treble meter wrapping around the accessory 1104. In particular, the treble meter graphically depicts the treble level as a plurality of black dots surrounding the perimeter of the accessory 1104.

At time T5, the user's hand 1108 rotates the accessory 1104 clockwise to increase the treble level. The touch-sensitive display 1100 changes the numerical indicator displayed through the accessory 1104, providing feedback that the treble level goes to 8. Further, the number of black dots in the volume meter is increased based on the rotation of the accessory 1104 to provide visual feedback of the increased volume.

At time T6, the accessory 1104 is removed from the display surface 1102, and the touch-sensitive display 1100 capacitively-recognizes there is no touch input from the accessory 1104. Accordingly, the touch-sensitive display 1100 adjusts visual presentation of the GUI of the sound mixer application to depict the volume level, the balance level, the bass level and the treble level.

The touch-sensitive display 1100 may vary visual presentation of an image in alignment with the accessory 1104, as well as other images positioned in relation to the accessory 1104 in any suitable manner based on the position, rotation, touch-condition, or other measurable parameter of the accessory 1100.

Figure 12:
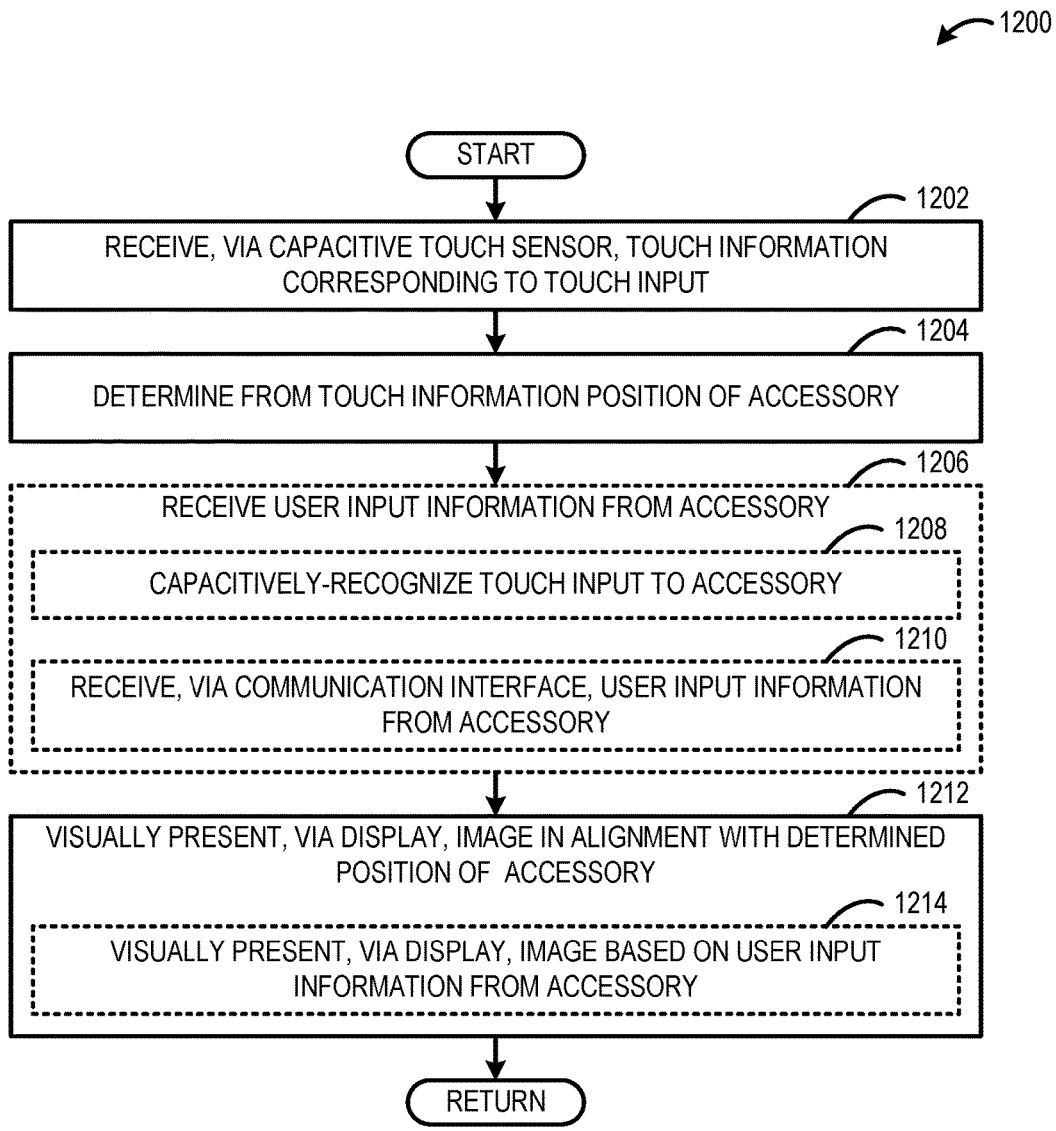
FIG. 12 shows a method for visually presenting an image in alignment with an image transfer structure of an accessory based on capacitively-recognizing the accessory.

FIG. 12 shows a method 1200 for visually presenting images based on interaction with an accessory that may be performed by a touch-sensitive display. For example, the method 1200 may be performed by the touch-sensitive display 101 of FIG. 1.

At 1202, the method 1200 includes receiving, via a capacitive touch sensor of the touch-sensitive display, touch information corresponding to touch input. In one example, the touch information includes a 2D map or touch data frame.

At 1204, the method 1200 includes determining from the touch information a position of the accessory. In one example, the position of the accessory is determined using a previously-trained, machine-learning detection tool.

In some implementations, at 1206, the method 1200 optionally may include receiving user input information from the accessory. In some cases, at 1208, the method 1200 optionally may include capacitively-recognizing touch input. In some cases, at 1210, the method 1200 optionally may include receiving, via a communication interface, user input information from the accessory. In one example, the user input information is derived from a rotational position of the accessory. In another example, the user input information is derived from a state of a button of the accessory.

At 1212, the method 1200 includes visually presenting, via a display, an image in alignment with the determined position of the accessory. At 1214, the method 1200 optionally includes visually presenting, via the display, the image based on the user input information received from the accessory.

Figure 13:
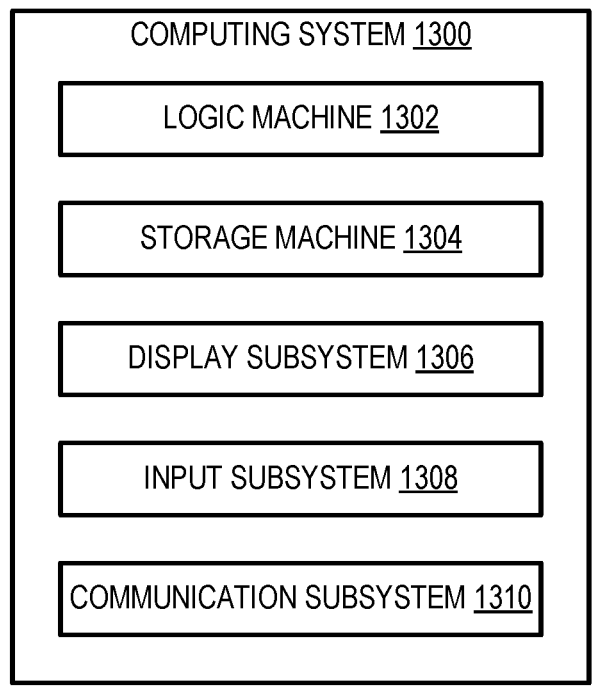
FIG. 13 shows an example touch-sensitive computing system.

FIG. 13 schematically shows a non-limiting implementation of a touch-sensitive computing system 1300 that can enact one or more of the methods and processes described above. Touch-sensitive computing system 1300 is shown in simplified form. Touch-sensitive computing system 1300 may take the form of personal computers, tablet computers, home-entertainment computers, network computing devices, gaming devices, mobile computing devices, mobile communication devices (e.g., smart phone), and/or other computing devices having touch-sensitive displays. For example, touch-sensitive computing system 1300 is an example of the touch-sensitive display 101 of FIG. 1, as well as other devices described herein.

Touch-sensitive computing system 1300 includes a logic machine 1302 and a storage machine 1304. Further, computing system 1300 includes, or interfaces with, a display subsystem 1306 including a touch-sensitive display. Touch-sensitive computing system 1300 may optionally include an input subsystem 1308, communication subsystem 1310, and/or other components not shown in FIG. 13.

Logic machine 1302 includes one or more physical devices configured to execute instructions. For example, the logic machine 1302 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1302 may include one or more processors configured to execute software instructions. Additionally or alternatively, the logic machine 1302 may include one or more hardware or firmware logic machines configured to execute hardware or firmware instructions. Processors of the logic machine 1302 may be single-core or multi-core, and the instructions executed thereon may be configured for sequential, parallel, and/or distributed processing. Individual components of the logic machine 1302 optionally may be distributed among two or more separate devices, which may be remotely located and/or configured for coordinated processing. Aspects of the logic machine 1302 may be virtualized and executed by remotely accessible, networked computing devices configured in a cloud-computing configuration.

Storage machine 1304 includes one or more physical devices configured to hold instructions executable by the logic machine 1302 to implement the methods and processes described herein. When such methods and processes are implemented, the state of storage machine 1304 may be transformed—e.g., to hold different data.

Storage machine 1304 may include removable and/or built-in devices. Storage machine 1304 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1304 may include volatile, nonvolatile, dynamic, static, read/write, read-only, random-access, sequential-access, location-addressable, file-addressable, and/or content-addressable devices.

It will be appreciated that storage machine 1304 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1302 and storage machine 1304 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 1306 may be used to present a visual representation of data held by storage machine 1304. This visual representation may take the form of a graphical user interface (GUI). As the herein described methods and processes change the data held by the storage machine 1304, and thus transform the state of the storage machine 1304, the state of display subsystem 1306 may likewise be transformed to visually represent changes in the underlying data. Display subsystem 1306 may include one or more display devices utilizing virtually any type of technology. Such display devices may be combined with logic machine 1302 and/or storage machine 1304 in a shared enclosure, or such display devices may be peripheral display devices.

When included, input subsystem 1308 may comprise or interface with one or more user-input devices such as a keyboard, mouse, touch screen, or game controller. In some implementations, the input subsystem 1308 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1310 may be configured to communicatively couple touch-sensitive computing system 1300 with one or more other computing devices. Communication subsystem 1310 may include wired and/or wireless communication devices compatible with one or more different communication protocols. As non-limiting examples, the communication subsystem 1310 may be configured for communication via a wireless telephone network, or a wired or wireless local- or wide-area network. In some implementations, the communication subsystem 1310 may allow touch-sensitive computing system 1300 to send and/or receive messages to and/or from other devices via a network such as the Internet.

In an example, an accessory for a touch-sensitive display, comprises an image transfer structure configured to relay or transfer, above the touch-sensitive display, an optical display plane of an image displayed by the touch-sensitive display, and a capacitive marker fixed relative to the image transfer structure and capacitively-recognizable by the touch-sensitive display such that the touch-sensitive display visually presents the image in alignment with the image transfer structure. In this and/or other examples, the image transfer structure alternatively or additionally may include a view surface and an interface surface spaced apart from the view surface, the interface surface may be configured to be placed on the touch-sensitive display, and the image transfer structure may be configured to relay or transfer the display plane of the image to the view surface. In this and/or other examples, the image transfer structure alternatively or additionally may include a fiber optic. In this and/or other examples, the image transfer structure alternatively or additionally may include a projection surface and an interface surface spaced apart from the projection surface, the interface surface may be configured to be placed on the touch-sensitive display, and the image transfer structure may be configured to relay or transfer the display plane above the projection surface. In this and/or other examples, the image transfer structure alternatively or additionally may include an array-based imaging sheet. In this and/or other examples, the capacitive marker alternatively or additionally may include one or more features from which a rotational orientation of the accessory is recognizable by the touch-sensitive display, and the touch-sensitive display may visually present the image based on the rotational orientation of the accessory. In this and/or other examples, accessory alternatively or additionally may further comprise a capacitive touch indicator configured such that touch input on the capacitive touch indicator is capacitively-recognizable by the touch-sensitive display. In this and/or other examples, the touch-sensitive display alternatively or additionally may visually present the image based on capacitively-recognizing the touch input on the capacitive touch indicator. In this and/or other examples, the accessory alternatively or additionally may further comprise a gripping member forming an aperture at least partially filled by the image transfer structure such that the image is visible through the aperture. In this and/or other examples, the accessory alternatively or additionally may further comprise a base configured to rotationally interface with the gripping member, a logic device configured to derive user input information from a relative rotational position of the gripping member and the base, and a communication interface configured to send the user input information to the touch-sensitive display, the touch-sensitive display may visually present the image based on the user input information. In this and/or other examples, the accessory alternatively or additionally may further comprise a button, a logic device configured to derive user input information from a press of the button, and a communication interface configured to send the user input information to the touch-sensitive display, the touch-sensitive display may visually present the image based on the user input information.

In an example, an accessory configured to be placed on a display surface of a touch-sensitive display comprises an image transfer structure configured to relay or transfer, above the display surface, an optical display plane of an image displayed by the touch-sensitive display, a gripping member forming an aperture at least partially filled by the image transfer structure, and a capacitive marker fixed relative to the image transfer structure and capacitively-recognizable by the touch-sensitive display such that the touch-sensitive display visually presents the image in alignment with the image transfer structure and through the aperture. In this and/or other examples, the image transfer structure alternatively or additionally may include a view surface and an interface surface spaced apart from the view surface, the interface surface may be configured to be placed on the touch-sensitive display, and the image transfer structure may be configured to relay or transfer the display plane of the image to the view surface. In this and/or other examples, the image transfer structure alternatively or additionally may include a projection surface and an interface surface spaced apart from the projection surface, the interface surface may be configured to be placed on the touch-sensitive display, and the image transfer structure may be configured to relay or transfer the display plane above the projection surface. In this and/or other examples, the capacitive marker alternatively or additionally may include one or more features from which a rotational orientation of the accessory is recognizable by the touch-sensitive display, and the touch-sensitive display may visually present the image based on the rotational orientation of the accessory. In this and/or other examples, the accessory alternatively or additionally may further comprise a capacitive touch indicator at least partially arranged on the gripping member and configured such that touch input on the capacitive touch indicator is capacitively-recognizable by the touch-sensitive display, and the touch-sensitive display may visually present the image based on capacitively-recognizing the touch input on the capacitive touch indicator. In this and/or other examples, the accessory alternatively or additionally may further comprise a base configured to rotationally interface with the gripping member, a logic device configured to derive user input information from a relative rotational position of the gripping member and the base, and a communication interface configured to send the user input information to the touch-sensitive display; and the touch-sensitive display may visually present the image based on the user input information. In this and/or other examples, the accessory alternatively or additionally may further comprise a base configured to translationally interface with the gripping member, a logic device configured to derive user input information from a relative translational position of the gripping member and the base, and a communication interface configured to send the user input information to the touch-sensitive display and the touch-sensitive display may visually present the image based on the user input information.

In an example, a touch-sensitive display device comprises a capacitive touch sensor configured to capacitively-recognize touch input, a previously-trained, machine-learning detection tool configured to receive, via the capacitive touch sensor, touch information corresponding to the touch input, and determine from the touch information a position the accessory, and a display configured to visually present an image in alignment with the determined position of the accessory. In this and/or other examples, the touch-sensitive display device alternatively or additionally may further comprise a communication interface configured to receive user input information from the accessory; and wherein the display is configured to visually present the image based on the user input information.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. An accessory for a touch-sensitive display, comprising:
an image transfer structure including an interface surface and a projection surface spaced apart from the interface surface, the image transfer structure configured to relay or transfer, above the touch-sensitive display and in a space above the projection surface, an optical display plane of an image displayed by the touch-sensitive display; and
a capacitive marker fixed relative to the image transfer structure and capacitively-recognizable by the touch-sensitive display such that the touch-sensitive display visually presents the image in alignment with the image transfer structure.

2. The accessory of claim 1, wherein the image transfer structure includes an array-based imaging sheet.

3. The accessory of claim 1, wherein the capacitive marker includes one or more features around a periphery of the image transfer structure from which a rotational orientation of the accessory is recognizable by the touch-sensitive display, and wherein the touch-sensitive display visually presents the image interior the periphery of the image transfer structure based on the rotational orientation of the accessory.

4. The accessory of claim 1, further comprising:
a capacitive touch indicator positioned on a sidewall of the accessory and configured such that touch input on the capacitive touch indicator is capacitively-recognizable by the touch-sensitive display to indicate that the accessory is being gripped.

5. The accessory of claim 4, wherein the touch-sensitive display visually presents the image based on capacitively-recognizing the touch input on the capacitive touch indicator.

6. The accessory of claim 1, further comprising:
a gripping member forming an aperture at least partially filled by the image transfer structure such that the image is visible through the aperture.

7. The accessory of claim 6, further comprising:
a base configured to rotationally interface with the gripping member;

a logic device configured to derive user input information from a relative rotational position of the gripping member and the base; and
a communication interface configured to send the user input information to the touch-sensitive display, wherein the touch-sensitive display visually presents the image based on the user input information.

8. The accessory of claim 6, further comprising:
a button;
a logic device configured to derive user input information from a press of the button; and
a communication interface configured to send the user input information to the touch-sensitive display, wherein the touch-sensitive display visually presents the image based on the user input information.

9. An accessory configured to be placed on a display surface of a touch-sensitive display, the accessory comprising:
an image transfer structure configured to relay or transfer, above the display surface, an optical display plane of an image displayed by the touch-sensitive display;
a gripping member forming an aperture at least partially filled by the image transfer structure;
a base configured to rotationally interface with the gripping member;
a logic device configured to derive user input information from a relative rotational position of the gripping member and the base; and
a communication interface configured to send the user input information to the touch-sensitive display; and
a capacitive marker fixed relative to the base and capacitively-recognizable by the touch-sensitive display such that the touch-sensitive display visually presents the image based on the user input information and in alignment with the image transfer structure and through the aperture.

10. The accessory of claim 9, wherein the image transfer structure includes a view surface and an interface surface spaced apart from the view surface, wherein the interface surface is configured to be placed on the touch-sensitive display, and wherein the image transfer structure is configured to relay or transfer the display plane of the image to the view surface.

11. The accessory of claim 9, wherein the image transfer structure includes a projection surface and an interface surface spaced apart from the projection surface, wherein the interface surface is configured to be placed on the touch-sensitive display, and wherein the image transfer structure is configured to relay or transfer the display plane in a space above the projection surface.

12. The accessory of claim 9, wherein the capacitive marker includes one or more features from which a rotational orientation of the accessory is recognizable by the touch-sensitive display, and wherein the touch-sensitive display visually presents the image based on the rotational orientation of the accessory.

13. The accessory of claim 9, further comprising:
a capacitive touch indicator at least partially arranged on a sidewall of the gripping member and configured such that touch input on the capacitive touch indicator is capacitively-recognizable by the touch-sensitive display to indicate that the gripping member is being gripped, and wherein the touch-sensitive display visually presents the image based on capacitively-recognizing the touch input on the capacitive touch indicator.

14. An accessory for a touch-sensitive display, comprising:

an image transfer structure including an interface surface and a projection surface spaced apart from the interface surface, the image transfer structure configured to transfer, above the touch-sensitive display and in a space above the projection surface, an optical display plane of an image displayed by the touch-sensitive display;

a capacitive marker fixed relative to the image transfer structure and capacitively-recognizable by the touch-sensitive display such that the touch-sensitive display visually presents the image in alignment with the image transfer structure; and a capacitive touch indicator configured to make touch input on the capacitive touch indicator capacitively-recognizable by the touch-sensitive display.

15. The accessory of claim 14, wherein the image transfer structure includes an array-based imaging sheet.

16. The accessory of claim 14, wherein the capacitive marker includes one or more features around a periphery of the image transfer structure from which a rotational orientation of the accessory is recognizable by the touch-sensitive display, and wherein the touch-sensitive display visually presents the image interior the periphery of the image transfer structure based on the rotational orientation of the accessory.

17. The accessory of claim 14, wherein the touch-sensitive display visually presents the image based on capacitively-recognizing the touch input on the capacitive touch indicator.

18. The accessory of claim 14, further comprising:
a gripping member forming an aperture at least partially filled by the image transfer structure such that the image is visible through the aperture.

19. The accessory of claim 18, further comprising:
a base configured to rotationally interface with the gripping member;
a logic device configured to derive user input information from a relative rotational position of the gripping member and the base; and
a communication interface configured to send the user input information to the touch-sensitive display, wherein the touch-sensitive display visually presents the image based on the user input information.

20. The accessory of claim 18, further comprising:
a button;
a logic device configured to derive user input information from a press of the button; and
a communication interface configured to send the user input information to the touch-sensitive display, wherein the touch-sensitive display visually presents the image based on the user input information.

* * * * *